United States Patent
Sorotokin et al.

(10) Patent No.: US 10,002,237 B2
(45) Date of Patent: *Jun. 19, 2018

(54) SYSTEM AND METHOD FOR PARTS-BASED DIGITAL RIGHTS MANAGEMENT

(71) Applicant: Adobe Systems Incorporated, San Jose, CA (US)

(72) Inventors: Peter Sorotokin, Cupertino, CA (US); James L. Lester, Dublin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 457 days.

This patent is subject to a terminal disclaimer.

(21) Appl. No.: 14/811,202

(22) Filed: Jul. 28, 2015

(65) Prior Publication Data

US 2015/0332178 A1 Nov. 19, 2015

Related U.S. Application Data

(63) Continuation of application No. 12/364,468, filed on Feb. 2, 2009, now Pat. No. 9,112,862.

(51) Int. Cl.
| | |
|---|---|
| *G06F 21/10* | (2013.01) |
| *G06Q 10/06* | (2012.01) |
| *H04L 29/06* | (2006.01) |
| *H04N 21/4627* | (2011.01) |

(52) U.S. Cl.
CPC ............ *G06F 21/10* (2013.01); *G06Q 10/06* (2013.01); *H04L 63/10* (2013.01); *H04L 63/123* (2013.01); *G06Q 2220/18* (2013.01); *H04N 21/4627* (2013.01)

(58) Field of Classification Search
CPC ....... G06F 21/10; G06F 21/105; G06Q 10/06; G06Q 2220/18; H04N 21/4627; H04L 63/10; H04L 63/123; H04L 9/32
See application file for complete search history.

(56) References Cited

U.S. PATENT DOCUMENTS

| | | |
|---|---|---|
| 5,910,987 A | 6/1999 | Ginter et al. |
| 7,024,393 B1 | 4/2006 | Peinado et al. |
| 7,555,464 B2 | 6/2009 | Candelore |
| 2001/0032088 A1 | 10/2001 | Utsumi et al. |
| 2002/0048369 A1 | 4/2002 | Ginter et al. |
| 2002/0085722 A1 | 7/2002 | Asano et al. |
| 2005/0169473 A1 | 8/2005 | Candelore |

(Continued)

*Primary Examiner* — Tamara Teslovich Kyle
(74) *Attorney, Agent, or Firm* — Finch & Maloney PLLC

(57) ABSTRACT

Various embodiments of a system and method for parts-based digital rights management are described. Various embodiments may include a digital rights management component configured to receive content comprising a plurality of portions of content. The digital rights management component may also receive a license for the encrypted content; the license may include a plurality of permissions each specific to a respective portion of the content. Additionally, each permission may specify one or more access privileges for the respective portion of the content. The digital rights management component may receive a digital signature for the entire license. The digital rights management component may validate the digital signature to determine that the permissions have not been modified. The digital rights management component may also be configured to, in response to determining that said permissions have not been modified, provide access to content in accordance with said license including said permissions.

20 Claims, 8 Drawing Sheets

(56) References Cited

U.S. PATENT DOCUMENTS

| | | |
|---|---|---|
| 2005/0216413 A1 | 9/2005 | Murakami et al. |
| 2006/0048232 A1 | 3/2006 | Jung et al. |
| 2006/0095792 A1 | 5/2006 | Hurtado et al. |
| 2006/0165233 A1 | 7/2006 | Nonaka et al. |

SYSTEM AND METHOD FOR PARTS-BASED DIGITAL RIGHTS MANAGEMENT

This application is a continuation of U.S. patent application Ser. No. 12/364,468 (filed 2 Feb. 2009), the entire disclosure of which is incorporated herein by reference.

BACKGROUND

Field of the Invention

The present invention is directed to computer systems. More particularly, it is directed to digital rights management within a computing environment.

Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years the ubiquity of the Internet and the World Wide Web has paved the way for alternative methods of obtaining and consuming content. For example, a user might log on to a music retailer's website and download a digital version of a music album. In other example, a user might log on to a movie subscription provider's website to download or stream a motion picture to view on a personal computer. In the case of books, a user might log on to a bookseller's website and download an electronic book ("e-book") for view on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized individuals.

SUMMARY

Various embodiments of a system and method for parts-based digital rights management are described. Various embodiments may include a digital rights management component configured to receive content comprising a plurality of portions of content. The digital rights management component may also receive a license for the encrypted content; the license may include a plurality of permissions each specific to a respective portion of the content. Additionally, each permission may specify one or more access privileges for the respective portion of the content. For example, permissions may include access privileges that specify who can access the content (e.g., an individual or group) and/or how the content may be accessed, viewed, listened, played, copied, pasted, cut, shared (e.g., transferred to other individuals or devices) or otherwise utilized. The digital rights management component may receive a digital signature for the entire license. The digital rights management component may validate the digital signature to determine that the permissions have not been modified. The digital rights management component may also be configured to, in response to determining that said permissions have not been modified, provide access to content in accordance with said license including said permissions. In this way, if the permissions of the license are tampered with (e.g., via hex editor), such tampering will invalidate the digital signature. The digital rights management component may be configured to prevent access to the electronic content if the digital signature is invalidated.

Figure 1:
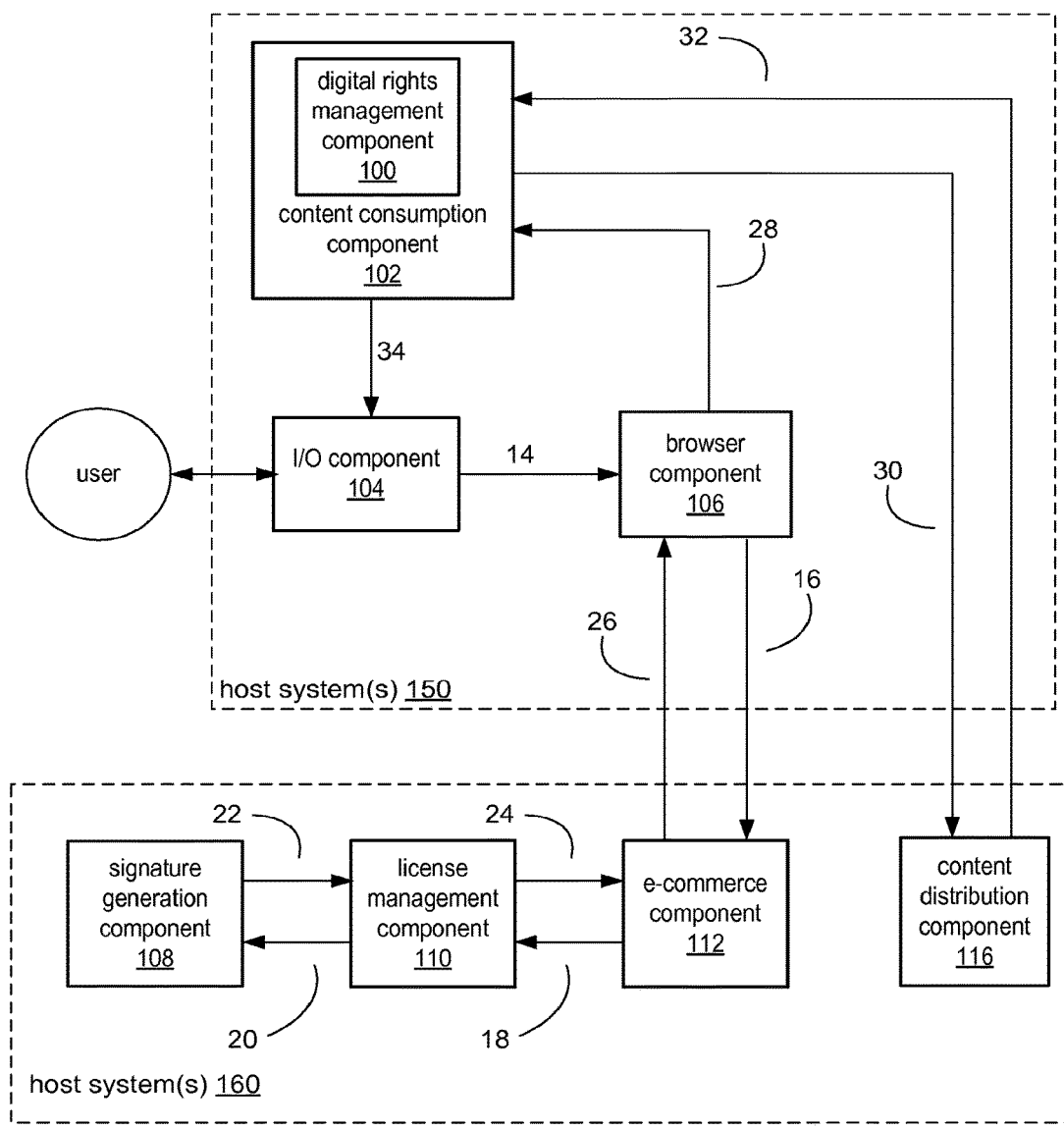
FIG. 1 illustrates a logical representation of the various components of the system for parts-based digital rights management, according to various embodiments.

While the system and method for parts-based digital rights management is described herein by way of example for several embodiments and illustrative drawings, those skilled in the art will recognize that the system and method for parts-based digital rights management is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for parts-based digital rights management as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

Various embodiments of a system and method for parts-based digital rights management are described. The system and method for parts-based digital rights management may include a digital rights management component configured to process licenses that specify different types of rights management for different portions of the same electronic content. In various embodiments, such a license may include a master decryption key for decrypting various portions of electronic content. The digital rights management component may in various embodiments be configured to decrypt different portions of electronic content (e.g., different chapters of an e-book) with such master decryption key in order to generate corresponding unencrypted content parts. In various cases, the digital rights management component may be configured to decrypt various portions of electronic content with a decryption key that was generated from such master decryption key. For example, for each given portion (e.g., chapter, page range, etc.) of electronic content, the digital rights management component may be configured to combine (e.g., concatenate) the master decryption key with an identifier (e.g., an index number) of that portion, perform a cryptographic hash function on the result of such combination to generate a portion-specific decryption key, and decrypt that portion of content data with the portion-specific decryption key. In any case, the digital rights management component may be configured to decrypt all portions of content data with a decryption key that is either equivalent to or based upon the same master key. Other decryption techniques that may be performed by the digital rights management component will be described in more detail below.

In various embodiments, the digital rights management component may also be configured to enforce different permissions (e.g., allowed operations) on different portions of the same electronic content. For example, the digital rights management component may be configured to enable printing a particular chapter of an e-book while prohibiting the printing of other chapters of the e-book. Various other types of permissions will be described in more detail below. In various embodiments, the permissions enforced by the digital rights management component may be specified by license data for the electronic content. In order to prevent the tampering of such content, the digital rights management component may be configured to permit access to the content in accordance with such permissions only after a digital signature of the license has been validated. In this way, if the permissions of the license are tampered with (e.g., via hex editor), such tampering will invalidate the digital signature. The digital rights management component may be configured to prevent access to the electronic content if the digital signature is invalidated.

In various instances, this detailed description may refer to content (which may also be referred to as "content data," "content information" or simply "data" or "information"). In general, content may include any information or data that may be licensed to one or more individuals (or other entities, such as business or group). In various embodiments, content may include electronic representations of text and/or graphics, which may include but is not limited to data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe Photoshop (.PSD) format or some other format for electronically storing text, graphics and/or other information whether such format is presently known or developed in the future. In various embodiments, content may include electronic representations of music or other audio, which may include but is not limited to data files adhering to the MPEG-1 Audio Layer 3 (.MP3) format, Adobe Sound Document (.ASND) format or some other format configured to store electronic audio whether such format is presently known or developed in the future. In various embodiments, content may include electronic representations of videos, movies, or other multimedia, which may include but is not limited to data files adhering to Adobe Flash Video (.FLV) format or some other video file format whether such format is presently known or developed in the future. In some embodiments, content may include any combination of the above-described examples.

In various instances, this detailed disclosure may refer to a portion of electronic content, which may also be referred to herein as a "part" of the electronic content. Additionally, electronic content may be comprised of any number of portions, according to various embodiments. In various embodiments, a portion may include but is not limited to: characters, sentences, paragraphs, columns, pages, groups of pages, chapters, groups of chapters, images, some other portion, or some combination thereof. In some cases, a portion of electronic data may be specified as a byte range or some other range of data. In some embodiments, electronic content may be formatted according to a markup language (e.g., HTML) that includes child and parent elements organized in a hierarchical fashion; in various embodiments, a portion of electronic data may correspond to any of such elements. In some embodiments, a portion of electronic data may correspond to one or more audio tracks of an album or some other specified range of audio. In the case of video, portions of content data might correspond to one or more episodes from a season of episodes. In general, a portion of electronic content may include some portion of the content that does not include all of the data of such content.

In various instances, this detailed disclosure may refer to consuming content or to the consumption of content, which may also be referred to as "accessing" content, "viewing" content, "listening" to content, or "playing" content. In some cases, the particular term utilized may be dependent on the context in which it is used. For example, consuming an e-book may also be referred to as viewing or even reading the e-book. Similarly, consuming audio may also be referred to as listening to or playing the audio. In another example, consuming video may also be referred to as viewing or playing the video.

In various instances, this detailed description may refer to a device on which content may be consumed. In various embodiments, such a device may include but is not limited to a computing system (e.g., a desktop or laptop computer), an e-book reader, a digital audio player (e.g., an MP3 player), a personal digital assistant (PDA), a mobile phone, a smartphone, a digital photo frame, or any other device or system configured to access, view, read, write, and/or manipulate any of the content data described herein.

In various instances, this detailed description may refer to a cryptographic hash function (or simply "hash function"). The hash functions described herein may be any of various hash functions including, but not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPEMD-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of these hash functions. In various embodiments, any of the hash functions described herein may be substituted with a more generalized key derivation function. Key derivation functions may include one or more iterations or instances of such hash functions as well as other cryptographic operations in order to generate an encryption or decryption key. Examples of key derivation function may include but are not limited to any key derivation functions specified by Public Key Cryptography Standards (PKCS) (e.g., PKCS-5) or Adobe Password Security.

Parts-Based Digital Rights Management

Figure 7:
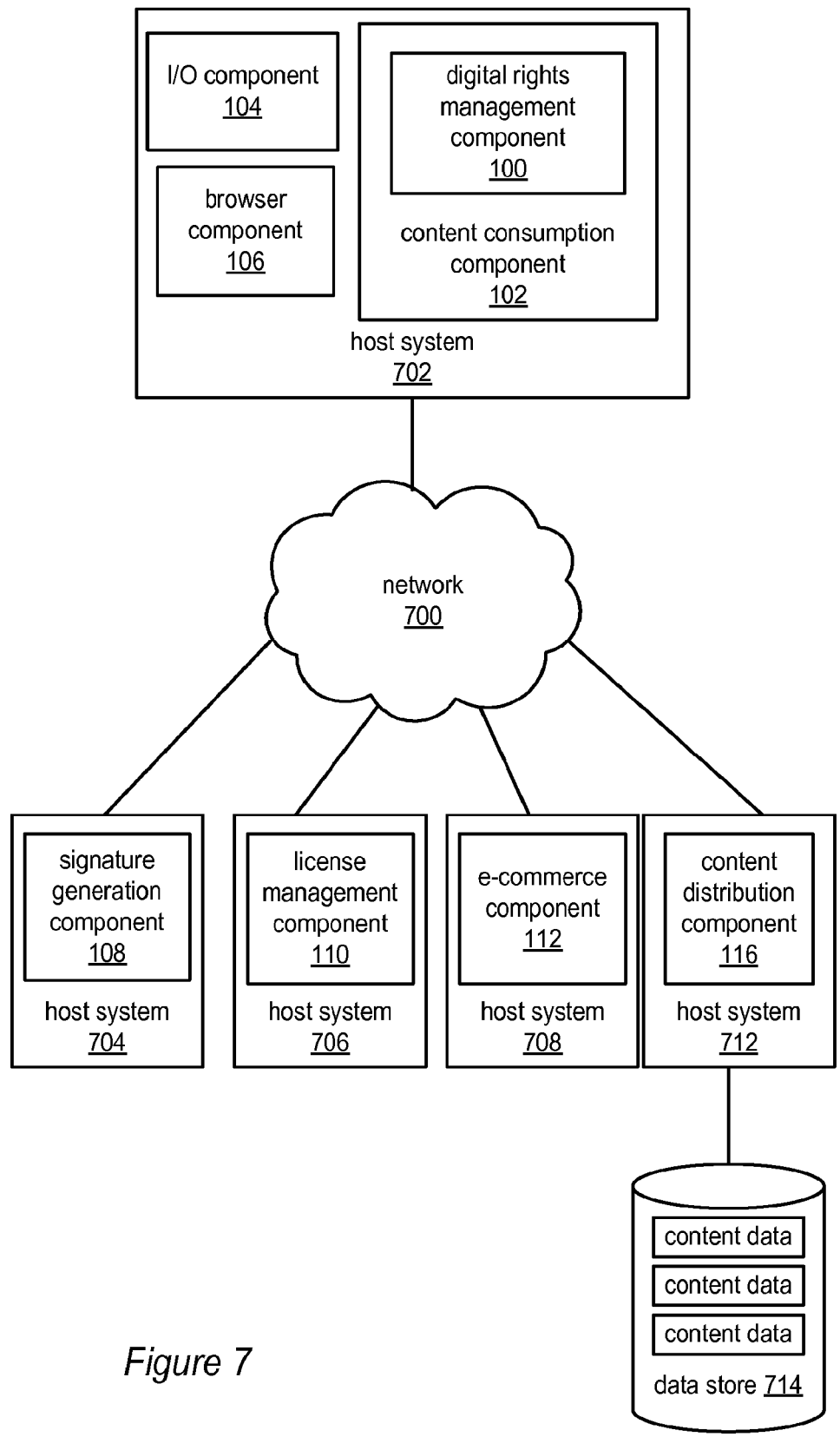
FIG. 7 illustrates a block diagram of one example of a system configuration, according to various embodiments.
Figure 8:
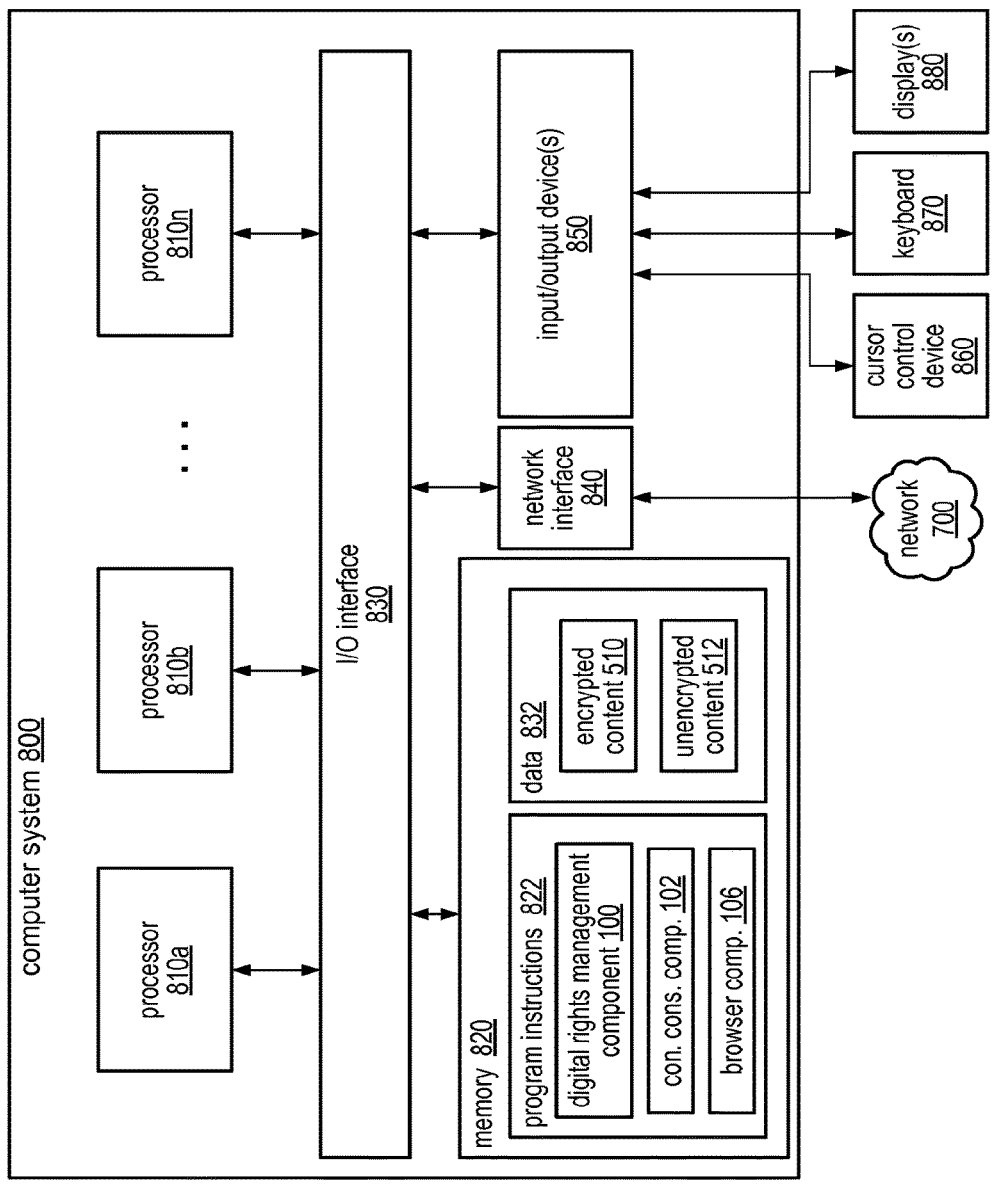
FIG. 8 an example computer system configured to implement various elements of the system and method for parts-based digital rights management, according to various embodiments.

FIG. 1 illustrates a logical representation of data flow in a system including a digital rights management component, such as digital rights management component 100. The various elements of FIG. 1 may be components of a variety of devices or computer systems; such devices and/or systems are generally illustrated as host system(s) 150 and host system(s) 160. For example, in one embodiment, each of the elements of FIG. 1 may be components of separate host systems. In other embodiments, groups of such elements may be implemented on a single host system. One example of a particular system configuration is illustrated in FIG. 7, which is described in more detail below. Additionally, one example of a host system (such as host system to implement host system(s) 150 and/or host systems(s) 160) is illustrated in FIG. 8, which is described in more detail below. In various embodiments, any element of FIG. 1 may be implemented in hardware (e.g., an Application Specific Integrated Circuit), software (e.g., program instructions stored on memory and executable by one or more processors), or some combination thereof. Furthermore, communications between elements of FIG. 1 may take place over dedicated communication lines, one or more computer networks (e.g., the Internet) (examples of such networks are described in more detail with respect to FIG. 7), or some combination thereof. Also note that FIG. 1 includes a plurality of directional data flows (denoted by an arrowhead); however, such directional data flows illustrate only a general direction of relevant data flow. In some cases, such flows may include bidirectional communication that do not necessarily travel in the illustrated direction (e.g., an acknowledge signal that confirms the receipt of a data packet). Generally speaking, the description of FIG. 1 is intended to demonstrate the functional characteristics of the various illustrated elements; this description is not intended to limit the implementation of such elements to any single system or device.

One example of data flow in the illustrated system is described herein. For clarity of description, the illustrated digital rights management component 100, the content consumption component 102, input/output (I/O) component 104 and browser component 106 may be described as implemented on the same host system (e.g., a desktop or laptop computer system). However, it should be noted that various embodiments are not limited to such configuration. For instance, in other embodiments, content consumption component 102 may be implemented on a host system (e.g., e-book reader) separate from a host system (e.g., a desktop or laptop computer) that implements browser component 106.

Input/output component 104 may include logic for communicating with various input and output devices (not illustrated), such as a text entry device (e.g., a keyboard), a pointing device (e.g., a mouse, touch screen surface, or stylus), a display device (e.g., a computer monitor), or some other device configured to transmit or receive data from a host system. In some embodiments, the input and output devices to which I/O component 104 is configured to communicate may accept input from or deliver output to a user.

The data flow described herein may begin with I/O component 104 providing input 14 to browser component 106, which may in general be any component configured to communicate with other computer systems. One example of a browser component 106 may include a network-based browser (e.g., a web browser) configured to retrieve data from a network (e.g., retrieving web pages or other data from the Internet). In various embodiments, input 14 may include data necessary for acquiring content (e.g., e-books, music, videos, etc.) over a network. For instance, such input may include a web address of a web-based retailer's website (e.g., an online bookstore), one or more indications to purchase or otherwise acquire content, and/or transaction information such as a credit card number or other account from which funds may be withdrawn. Browser component 106 may perform the necessary communications to carry out content acquisition as illustrated by data flow 16, which is transmitted to an e-commerce component 112. In one embodiment, e-commerce component 112 may be configured to host an e-commerce website, provide a product or content catalogue (e.g., a listing of available e-books, music, movies, etc.), and carry out a transaction for purchasing such content. In the illustrated example, data flow 16 may include data for the purchase of content from a retailer controlling e-commerce component 112 (e.g., an indication of which content to purchase and payment instructions).

Figure 2:
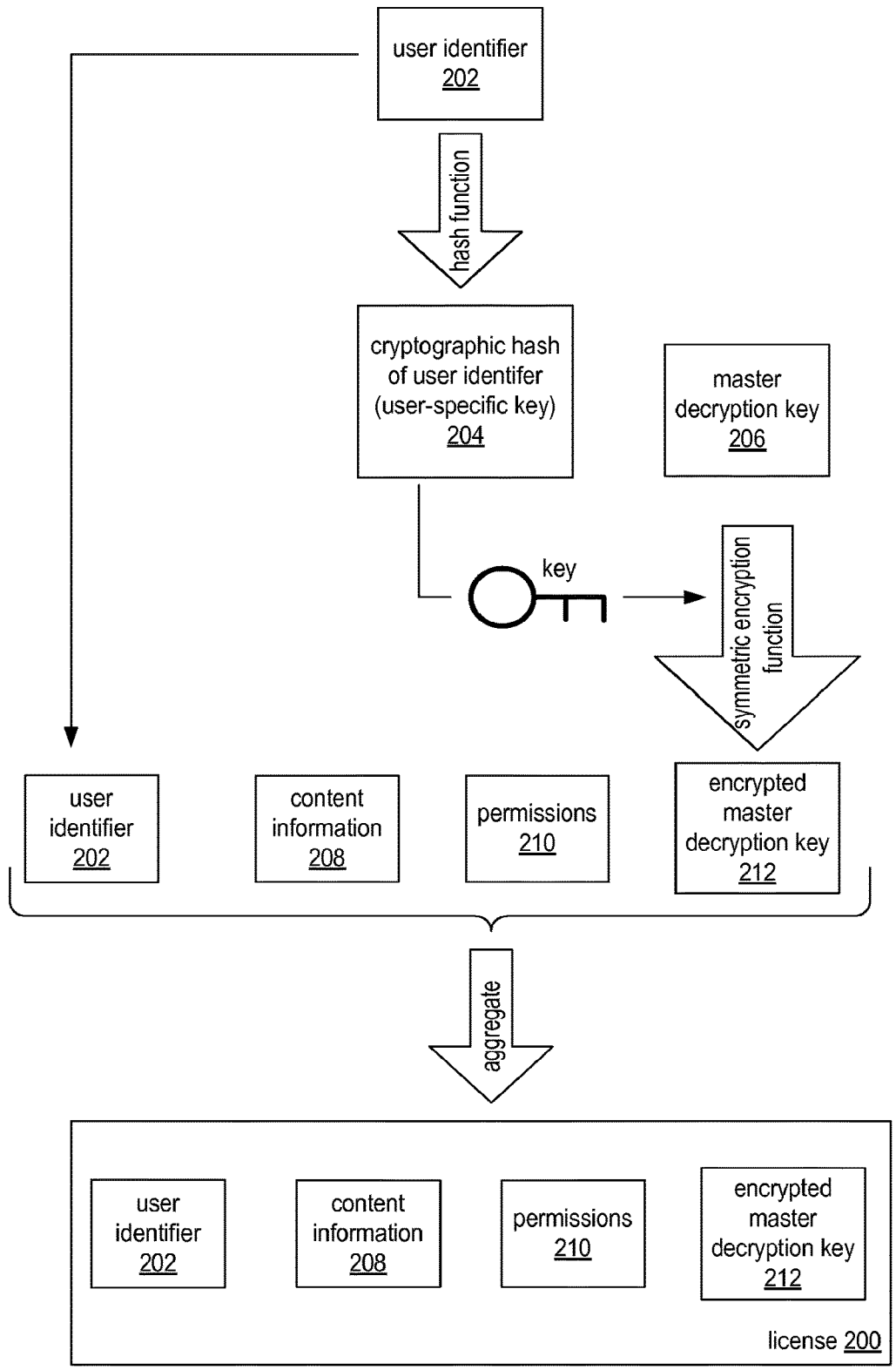
FIG. 2 illustrates a flow diagram for generating a content license, according to various embodiments.

E-commerce component 112 may transmit a user identifier (e.g., an identifier that identifies the user requesting the electronic content) to license management component 110, as illustrated by data flow 18. In other cases, license management component may obtain such user identifier from other components, such as browser 106, content consumption component 102, or signature generation component 108. In various embodiments, license management component 110 may be configured to generate a license for the content from the user identifier. FIG. 2 illustrates one example of how license management component 110 may generate a license according to various embodiments. As illustrated, license management component 110 may be configured to perform a cryptographic hash function on the user identifier (e.g., user identifier 202) described above. For instance, license management component may perform a SHA-1 hash of the user's name. The result of this operation is illustrated as cryptographic hash of user identifier 204. The license management component may be configured to perform a symmetric encryption function on a master decryption key 206 for the content (in various embodiments, content is delivered to a user's device in encrypted form). Examples of a symmetric encryption function include ciphers such as Twofish, Serpent, Advanced Encryption Standard (AES), Blowfish, CASTS, RC4, TDES, IDEA, some combination thereof or any other cipher whether currently known or developed in the future. In the illustrated embodiment, the symmetric encryption function may be configured to utilize the hash 204 as the encryption key of the function; the symmetric key function performed by the license management function may encrypt the master decryption key 206 with the key (i.e., hash 204) to generate an encrypted version of the master decryption key, which is illustrated as encrypted master decryption key 212. In other embodiments, other encryption functions (e.g., asymmetric encryption functions, such as Public-key cryptography) may be utilized.

As illustrated in FIG. 2, data representing the encrypted master decryption key 212, user identifier 202, content information 208, and permissions 210 are aggregated into a license file or token illustrated as license 200. In various embodiments, content information 208 may generally include any information that indicates the content for which the license applies, which may include but is not limited to a content identifier (e.g., an alphanumeric string), a Stock Keeping Unit (SKU) of the electronic content, or some other information that identifies the content. In some embodiments, content information may specify a memory location or network location at which the content is located, which may include but is not limited to Uniform Resource Locators (URLs), Uniform Resource Names (URNs), or some other Uniform Resource Identifier (URI).

In various embodiments, the content that is retrieved may include a content map that includes a mapping or association of multiple portion identifiers to respective portions of the document. For example, in one embodiment, the content map may include an index of multiple positive integers (e.g., 1, 2, 3, 4 and so on) and for each of such integers and indication of an associated portion within the electronic content (e.g., chapters, pages, or another other portion described above). In some cases, each portion of the electronic content requested by host system(s) 150 may be associated with a respective identifier in the index. In other cases, only some portions may be associated with a respective identifier in the index.

Permissions 210 may specify one or more restrictions on the content or specify how the content may be consumed. For example, permissions may include access privileges that specify who can access the content (e.g., an individual or group) and/or how the content may be accessed, viewed, listened, played, copied, pasted, cut, shared (e.g., transferred to other individuals or devices) or otherwise utilized. The permissions may also specify a period of time for which the license is valid or a period of time for which specific permissions are valid. In some embodiments, permissions may specify on what type of device the electronic content may be consumed and/or what operations may be performed on the electronic content via such device. In various embodiments, permissions 210 may specify separate permissions for each portion of the electronic content. In one embodiment, for each portion of content specified in the content map described above, permissions 210 may specify a respective set of permissions for that content.

Returning to FIG. 1, license management component 110 may transmit the generated license (e.g., license 200) to signature generation component 108, as illustrated by data flow 20. Signature generation component 108 may be configured to digitally sign license 200 with a private key. In various embodiments, this private key is secret and only known to the entity controlling signature generation component 10. As described in more detail herein, the signature generation component may be configured to generate a public key that forms a public key—private key pair with the aforesaid private key, which may in various embodiments mean that digital signatures created with the private key may be validated with the public key. Note that only the private key can create such digital signatures. An example of operations performed by the signature generation component to generate a digital signature of license 200 is illustrated in FIG. 3.

Figure 3:
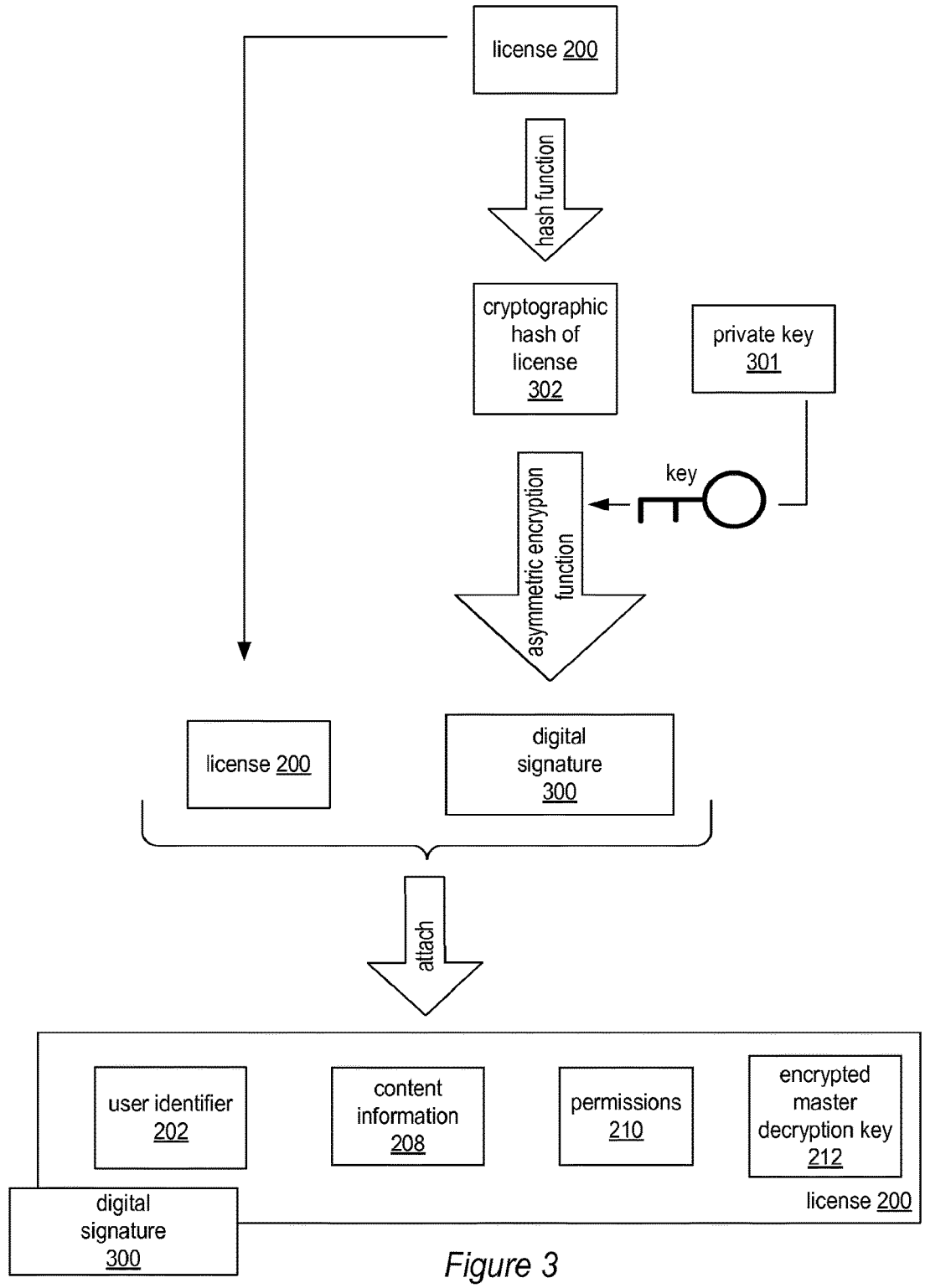
FIG. 3 illustrates a flow diagram for digitally signing a content license, according to various embodiments.

As illustrated in FIG. 3, the signature generation component may be configured to perform a cryptographic hash function (e.g., SHA-1) on license 200. The result of such operation is illustrated as cryptographic hash of license 302. The signature generation component may be configured to perform an asymmetric encryption function on hash 302 to generate a digital signature. In various embodiments, performing an asymmetric encryption function on hash 302 may include encrypting hash 302 with a private key 301, which may be the private key that the signature component may hold as a secret as described above. The result of this encryption process is digital signature 300, which may be validated with a public key that forms a private key—public key pair with private key 301 (e.g., the private key and public key may be generated as a pair by a key generation function performed by the signature generation component). Signature generation component 108 may be configured to provide such public key to other host systems within a digital certificate, such as an X.509 certificate in Public Key Infrastructure (PKI) systems. Such digital certificates may also be distributed by a trusted third party that can verify the public key is a valid public key of the signature generation component or an entity controlling such component. As demonstrated by the illustrated embodiment, the signature generation component may be configured to attach the generated digital signature 300 to license 200 (e.g., as metadata). Returning to FIG. 1, the signature generation component may be configured to provide the license 200 and the digital signature 300 of the license to license management component 110, as illustrated by data flow 22. In an alternative embodiment, signature generation component 108 may be configured to provide license management component with only the generated digital signature 300. For instance, since the license management component may already have knowledge of license 200 (e.g., since it is the component that generated the license), network bandwidth may be conserved by having digital generation component 108 configured to only transfer the digital signature back to license management component 110, according to some embodiments.

License management component may provide the digitally signed license (i.e., license 200 and digital signature 300) to e-commerce component 112, as illustrated by data flow 24. E-commerce component 112 may be configured to provide the digitally signed license to browser component 106 (as illustrated by data flow 26), which in turn may provide the digitally signed license to content consumption component 102 (as illustrated by data flow 28). Content consumption component 102 may include any component configured to consume the purchased content. For instance, content consumption component 102 may be an e-book reader, a document viewer or editor, a media player, or some other application configured to view, edit, modify, play, or otherwise consume acquired content.

Figure 4:
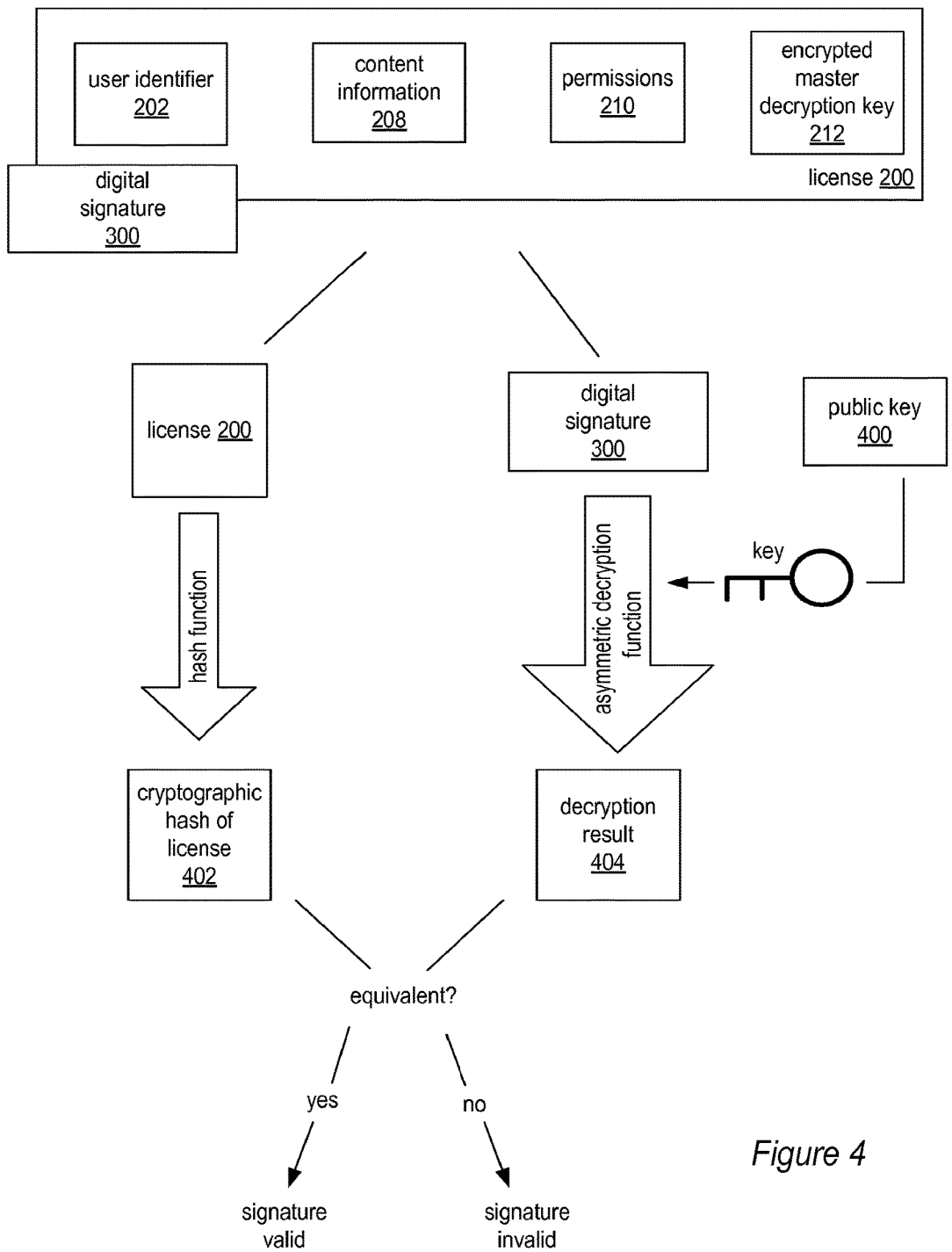
FIG. 4 illustrates a flow diagram for determining whether a digital signature of a content license is valid, according to various embodiments.

Digital rights management component 100 may be configured to process the digitally signed license. In various embodiments, the digital rights management component may first determine whether digital signature 300 is a valid signature of license 300. If the digital signature is valid, the digital rights management component may determine with certainty that the license is a license that was signed by signature generation component 108. FIG. 4 illustrates the manner in which digital rights management component 100 may determine whether digital signature 300 is a valid signature of license 300, according to some embodiments.

As illustrated by FIG. 4, the digital rights management component may begin the process of verifying the digital signature by parsing the digitally signed signature into license 200 and digital signature 300. (In some cases, the digital signature and license may already be separate and parsing may not be necessary.) The digital rights management component may perform a hash function (e.g., SHA-1) on license 200, the result of which is illustrated by cryptographic hash of license 402. In various embodiments, the digital rights management component utilizes the same hash function as utilized by the signature generation component as described above in regard to FIG. 3. The digital rights management component may also be configured to perform an asymmetrical decryption function on digital signature 300 by decrypting the digital signature 300 with a public key 400. In various embodiments, public key 400 may be the public key that corresponds to private key 301 described above with respect to FIG. 3 (e.g., the private key 301 and public key 400 may be generated as a pair by a key generation function performed by signature generation component 108). In various embodiments, public key 400 may be obtained by the digital rights management component 100 from a digital certificate, such as the digital certificates described above (e.g., an X.509 certificate in PKI). In various embodiments, the asymmetric decryption function performed by the digital rights management component 100 may correspond to (and/or be the same as) the asymmetric encryption function performed by the signature generation component as described above with respect to FIG. 3. The digital rights management component 100 may be configured to compare hash 402 with the result of the decryption function (illustrated as decryption result 404) to determine whether hash 402 and decryption result 404 are equivalent to each other (e.g., determine whether they are bit-wise equivalents). As illustrated, if digital rights management component 100 determines that hash 402 and decryption result 404 are equivalent to each other, digital rights management component 100 may determine that the digital signature is valid (i.e., the digital signature was generated by the signature generation component 108 and/or an entity controlling component 108). As illustrated, if digital rights management component 100 determines that hash 402 and decryption result 404 are not equivalent to each other, digital rights management component 100 may determine that the digital signature is invalid (i.e., the digital signature was not generated by the signature generation component 108 and/or an entity controlling component 108).

If the digital signature is invalid, the digital rights management component 100 and/or the content consumption component 102 may be configured to prevent access to the content associated with the license. By enforcing this restriction, the digital rights management component may prevent the tampering of information within the license, such as the permissions 210. In embodiments where private key 301 is secure and digital rights management component prohibits access to content if the digital signature is invalid, there may be no conceivable way for unscrupulous individuals to change the contents of the license (e.g., by erasing or changing information in the license). If, for example, an individual attempted to change the contents (e.g., via hex editor) of permissions 210 to add additional permissions, such modification would change the data of license 200, which would change hash 402 such that it is not equivalent to decryption result 404. Accordingly, in this example, the digital rights management component would determine that the signature is invalid and that access to the electronic document is not permitted.

Returning to FIG. 1, if the digital rights management component determines that the digital signature is valid, the digital rights management component and/or content consumption component 102 may submit a request (as illustrated by data flow 30) to a content distribution component 116 for the unencrypted content. The content distribution company may provide an encrypted version of the requested content (after any necessary authentication procedures, if any), as illustrated by data flow 32. In various embodiments, the request for content 30 may be based on content information 208 of license 200. For instance, the request may specify an identifier of the content or specify a memory location or network location at which the content is located, which may include but is not limited to Uniform Resource Locators (URLs), Uniform Resource Names (URNs), or some other Uniform Resource Identifier (URI). In some cases, the request may be formatted to automatically download the encrypted content from such locations. It should be noted that the content information 208 (e.g., a URL of the content) cannot be spoofed or modified (e.g., with a hex editor) since that would invalidate the digital signature of the license.

In some cases, the encrypted content retrieved from the content distribution component 116 may include multiple portions, each of which may be encrypted with the same encryption key. In some embodiments, such content may be encrypted (e.g., asymmetrically encrypted) with a key that is equivalent to master decryption key 206. In one example, all of the electronic content may be encrypted with a key derived from decryption key 206, such as a key that is equivalent to the cryptographic hash (e.g., SHA-1) of the concatenation (or some other function) of the master decryption key 206 and content map described above (or some portion of the content map). In other embodiments, each portion of the electronic content may be encrypted with a different key from a set of keys derived from the master decryption key 206. For example, in one embodiment, a given portion of the electronic content may be encrypted with a key that is equivalent to the concatenation (or some other function) of the master decryption key 206 and the identifier of content map (which may be included in the electronic content) that identifies the given portion of the electronic content. In this way, each portion of the requested electronic content may be encrypted with a different key such that all of the different keys are generated from or based on the same master key 206.

Figure 5:
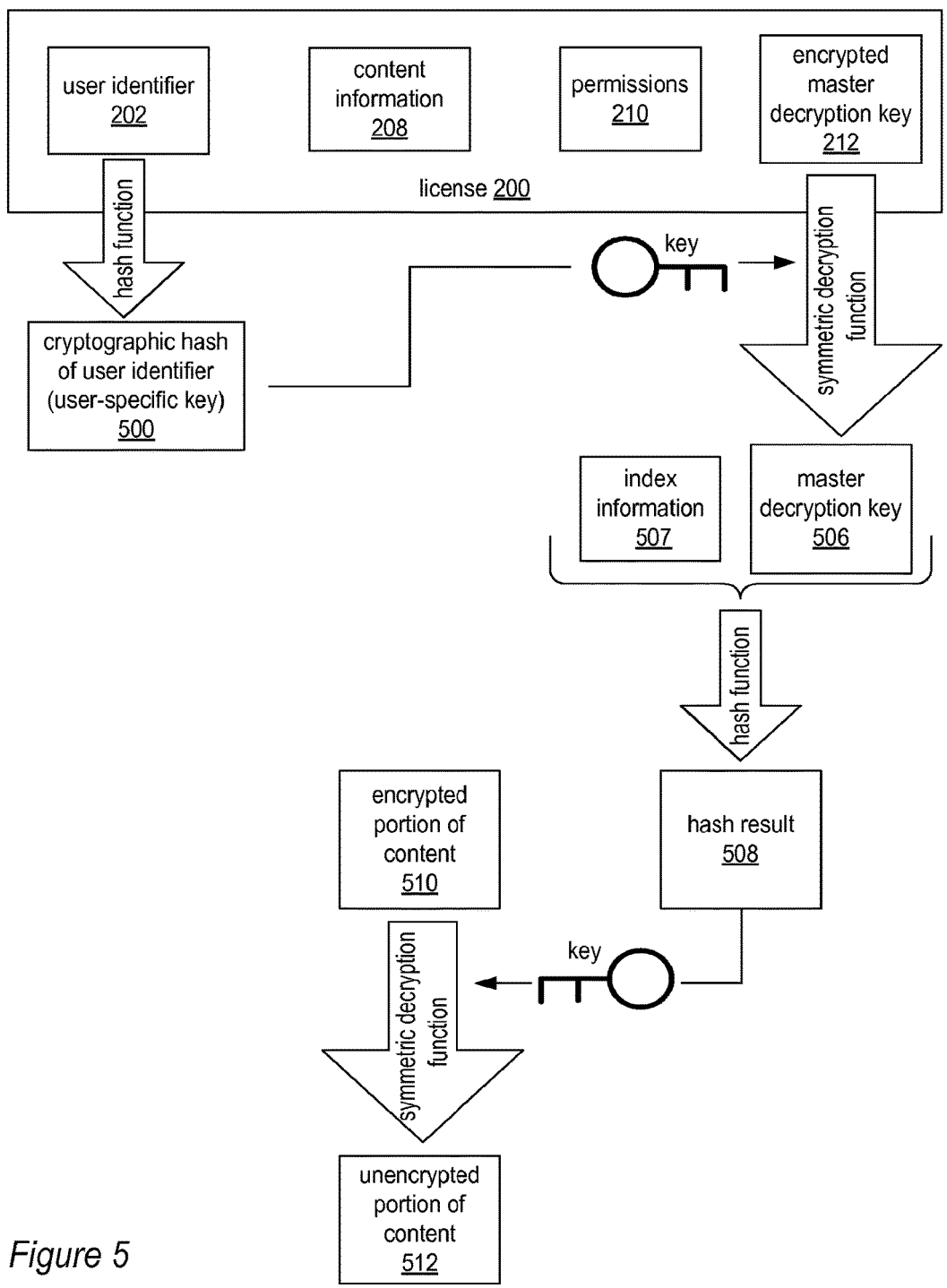
FIG. 5 illustrates a flow diagram for decrypting electronic content, according to various embodiments.

As described above, the content that is acquired via data flow 32 may be in an encrypted form. Accordingly, the digital rights management component may be configured to decrypt such content (if the digital signature is determined to be valid, as described above). FIG. 5 illustrates the manner in which the digital rights management component 100 may decrypt the encrypted content to generate an unencrypted version of the content suitable for consumption.

As illustrated by FIG. 5, the digital rights management component may be configured to perform a cryptographic hash function (e.g., SHA-1) on user identifier 202 of the license 200. The result of such operation is illustrated as cryptographic hash of user identifier 500, which may also be referred to as a user-specific key. In various embodiments, such hash function may be the same hash function utilized to generate cryptographic hash of user identifier 204 described above with respect to FIG. 2. The digital rights management component 100 may also be configured to decrypt the encrypted master decryption key with a symmetric decryption function (which may be the same as the symmetric encryption function used to generate the encrypted master decryption key). The digital rights management component may be configured to utilize cryptographic hash of user identifier 500 as the key for such symmetric decryption function. The result of such decryption is illustrated as master decryption key 506. Note that in various embodiments the master decryption key 506 will only be correct if the contents of license 200 have not been tampered with, such as by hex editor (e.g., since that same user identifier was used for the encryption illustrated in FIG. 2). Also note that the symmetric decryption algorithm of FIG. 5 may in some cases be a cipher that is the same as a cipher that implemented the symmetric encryption algorithm of FIG. 2.

As demonstrated by the illustrated embodiment, the encrypted portion of content 510 (which may be content acquired via data flow 32) may be decrypted by the digital rights management component with a symmetric decryption function in order to generate unencrypted portion of content 512. As illustrated, master decryption key 506 (which, if correct, is the same as master decryption key 206 of FIG. 2) may be utilized as the decryption key in such decryption process. In other embodiments, such as that of the illustrated embodiment, the master decryption key may be used to generate another encryption key, which is then used to decrypt the encrypted portion of content 510.

As demonstrated above, the encrypted content may include multiple portions, each of which may be encrypted with the same encryption key. In some embodiments, such content may be encrypted (e.g., asymmetrically encrypted) with a key that is equivalent to master decryption key 206. In one example, all of the electronic content may be encrypted with a key derived from decryption key 206, such as a key that is equivalent to the cryptographic hash (e.g., SHA-1) of the concatenation (or some other function) of the master decryption key 206 and content map (or some portion of the content map described above). In this case, index information 507 may be equivalent to the entire content map, or some derivation thereof (e.g., the SHA-1 hash of content map). In this example, all portions of the received encrypted content may be decrypted with the same key 508 to generate multiple unencrypted portions of content 512.

In other embodiments, each portion of the electronic content may be encrypted with a different key from a set of keys derived from the master decryption key 206 (to which master decryption key 506 should be equivalent). For example, in one embodiment, a given portion of the electronic content may be encrypted with a key that is equivalent to the concatenation (or some other function) of the master decryption key 506 and the identifier of the content map (which may be included within the electronic content) that identifies the given portion of the electronic content. In this way, each portion of the requested electronic content may be encrypted with a different key such that all of the different keys are generated from or based on the same master key 506. Accordingly, in this example, each portion of the encrypted content may be decrypted with a different key; each different key may be generated based on the same master key. For instance, in the illustrated embodiment, there may be multiple different hash results 508 generated; each of such hash results may be utilized to decrypt multiple different encrypted portions of content 510 to generate multiple different unencrypted portions of content 512. In these examples, index information 507 may be equivalent to an identifier of the content map that identifies the given portion of the electronic content that is being decrypted.

If the decryption key (e.g., hash result 506) is correct, the result of the decryption process may be unencrypted content 512 (which may be provided as output to a user as data flow 34). Also note that the symmetric decryption function utilized to generate unencrypted content 512 may be a cipher that is the same as a cipher used to originally encrypt the content.

The digital rights management component may permit unencrypted content 512 to be consumed on content consumption component 102, which may be implemented via any of the various devices described herein (e.g., laptop, e-book reader, MP3 player, etc.), according to various embodiments. Note that in some embodiments, the digital rights management component may enforce on the content permissions specified in the permissions data 210 of license 200. For example, permissions may specify who can access the content (e.g., an individual or group) and/or how the content may be viewed, listened, played, copied, pasted, cut, shared or otherwise utilized in accordance with the above-described permissions 210. The digital rights management component may restrict access to the unencrypted content in accordance with such permissions. The permissions may also specify a period of time for which the license is valid. Accordingly, the digital rights management component may be configured to prohibit access to the unencrypted content outside of such period of time. As described above, permissions 210 may specify a different set of permissions for each different portion of the electronic content (e.g., each portion as specified by the content map of the electronic content). The digital rights management component may be configured to enforce each such permissions on a per-portion basis. For example, for each portion of the content to be consumed, the digital rights management component may determine the respective permissions for such portion from permissions 210 and enforce such permissions on the consumption of that portion of the content. For example, the digital rights management component may enable certain chapters of an e-book to be printed whereas the printing of other chapters may be prohibited by the digital rights management component.

Example Methods

Figure 6A:
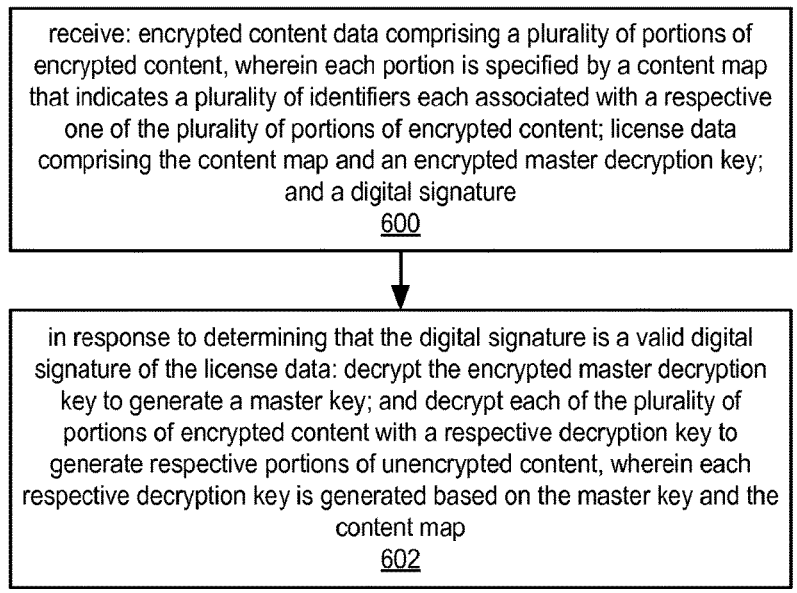
FIGS. 6A-B illustrate a flowchart of an exemplary method that may be implemented by a digital rights management component, according to various embodiments.
Figure 6B:
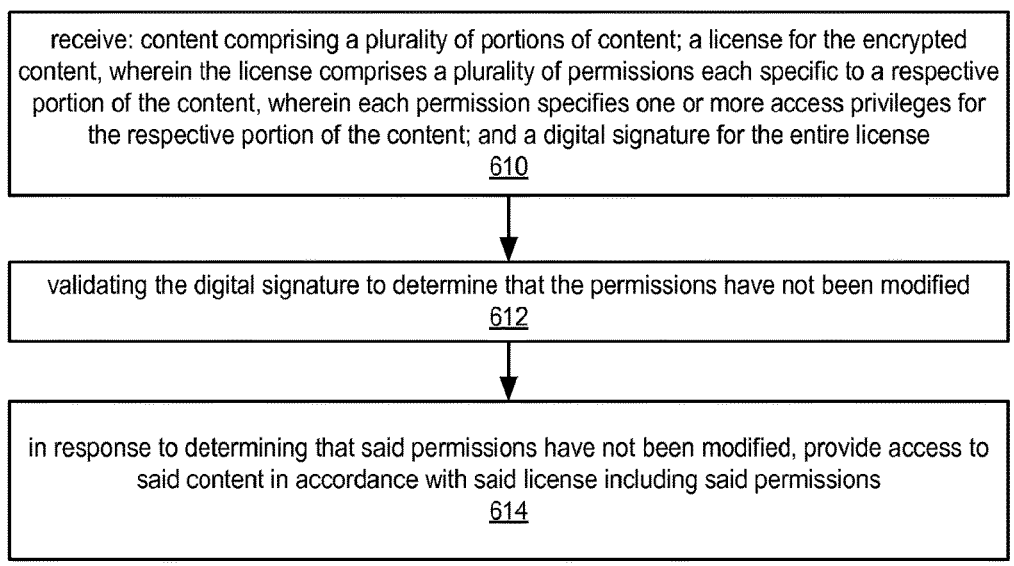

The system and method for parts-based digital rights management may include various methods, example flowcharts of which are illustrated in FIGS. 6A-B. In various embodiments, the method illustrated in FIG. 6A may be implemented by the digital rights management component described herein. As illustrated by block 600, the method may include receiving encrypted content data including multiple portions of encrypted content; each portion may be specified by a content map that indicates a plurality of identifiers each associated with a respective one of the plurality of portions of encrypted content. One example of such a content map is described above. The method may also include receiving license data comprising the content map and an encrypted master decryption key. One example of such an encrypted master decryption key includes encrypted master decryption key 212, which is described above. The method may also include receiving a digital signature, which if correct may be a digital signature of the license data (e.g., license 200). One example of such a digital signature is illustrated as digital signature 300 described above.

As illustrated by block 602, the method may also include, in response to determining that the digital signature is a valid digital signature of the license data (see e.g., FIG. 4), decrypting the encrypted master decryption key to generate a master key, one example of which is illustrated as master decryption key 506 of FIG. 5. The method may further include decrypting each of the portions of encrypted content with a respective decryption key to generate respective portions of unencrypted content; each respective decryption key is generated based on said master key and said content map. One example of the respective decryption key is illustrated as hash result 508 of FIG. 5. Examples of such a decryption process are illustrated in FIG. 5 as the decryption of encrypted content 510 to generate unencrypted content 512.

In various embodiments, the method illustrated in FIG. 6B may also be implemented by the digital rights management component described herein. As illustrated by block 610, the method may include receiving content comprising a plurality of portions of content. For example, such content may include content distributed by content distribution component 116, as described above. The method may also include receiving a license for the encrypted content that includes permissions that are each specific to a respective portion of the content. Examples of such permission are described above with respect to permissions 210. Each of the permission may specify one or more access privileges for the respective portion of the content. For example, permissions may include access privileges that specify who can access the content (e.g., an individual or group) and/or how the content may be accessed, viewed, listened, played, copied, pasted, cut, shared (e.g., transferred to other individuals or devices) or otherwise utilized. The method may also include receiving a digital signature for the entire license. Examples of such digital signature are described above with respect to digital signature 300.

As illustrated by block 612, the method may include validating the digital signature to determine that the permissions have not been modified. As illustrated by block 614, in response to determining that said permissions have not been modified, provide access to said content in accordance with said license including said permissions. For instance, in order to prevent the tampering of such content, in some embodiments, the method may include permitting access to the content in accordance with such permissions only after a digital signature of the license has been validated. In this way, if the permissions of the license are tampered with (e.g., via hex editor), such tampering will invalidate the digital signature.

Example System Configuration

FIG. 7 illustrates an example system configuration according to one embodiment of the system and method for parts-based digital rights management. In the illustrated embodiment, systems 702-714 may be configured to implement the various components described above with respect to FIG. 1. Each of systems 702-714 may be implemented by a variety of special purpose computers systems, including but not limited to desktop, laptop, or server computers systems. In some embodiments, some of such host systems may be implemented on a variety of other devices, such as an e-book reader, a digital audio player, a PDA, a mobile phone, a smartphone, a digital photo frame, or any other device or system configured to access, view, read, write, and/or manipulate any of content data described herein. Additionally, data store 714 may be implemented as a database or other system configured to store content data (such as the encrypted content data described herein). Additionally, any of such host systems may communicate to one another via network 700, which may be a local area network (LAN) (e.g., Ethernet), a wide area network (WAN) (e.g., the Internet), some other network configured to transport electronic data, or some combination thereof.

Example System

Various embodiments of a system and method for parts-based digital rights management, as described herein, may be executed on one or more computer systems, which may interact with various other devices. One such computer system is computer system 800 illustrated by FIG. 8, which may in various embodiments implement any of the components illustrated in FIG. 1. Computer system 800 may be capable of implementing a digital rights management component, such as digital rights management component 100, content consumption component 102, and browser component 106, which may be stored in memory as processor-executable program instructions. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, data 832 may include various images, such as images 130 and 430 described above. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a digital rights management component 100, content consumption component 102, and browser component 106 (as described above), are shown stored within system memory 820 as digital rights management component 100, content consumption component 102, and browser component 106, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network (e.g., network 780) and/or a wireless link, such as may be implemented via network interface 840.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 780), such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822 configured to implement a digital rights management component 100, content consumption component 102, and browser component 106. In one embodiment, any of digital rights management component 100, content consumption component 102, and browser component 106 may implement the methods described above, such as the methods illustrated by FIGS. 6A-B. In other embodiments, different elements and data may be included.

Those skilled in the art will appreciate that computer system 800 is merely illustrative and is not intended to limit the scope of various embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with various embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of various embodiments as defined in the claims that follow.

What is claimed is:

1. A computer-implemented method, comprising:
receiving a content item that is encrypted with a master decryption key;
receiving a license for the content item, wherein the license comprises (a) a user identifier that identifies a user authorized to receive the content item, (b) an encrypted version of the master decryption key, wherein the encrypted version is generated using a user-specific key that is derived by applying a cryptographic hash function to the user identifier, and (c) a plurality of permissions each specific to a respective portion of the content item;
receiving a digital signature for the license;
validating the digital signature to determine that the permissions have not been modified; and
in response to validating the digital signature, providing access to the content item in accordance with the license by (a) applying the cryptographic hash function to the user identifier included in the license to generate the user-specific key, (b) decrypting the encrypted version of the master decryption key using the user-specific key, and (c) decrypting at least a portion of the content item using the master decryption key.

2. The computer-implemented method of claim 1, wherein the encrypted version of the master decryption key is decrypted using the user-specific key and a symmetrical decryption function.

3. The computer-implemented method of claim 1, wherein:
the master decryption key comprises a combination of a decryption key and a segment identifier that identifies the portion of the content item; and
only the portion of the content item is decrypted using the master decryption key.

4. The computer-implemented method of claim 1, wherein the license further comprises content information that identifies the content item.

5. The computer-implemented method of claim 1, wherein validating the digital signature further comprises:
applying a hash function to the license to generate a cryptographic hash of the license;
applying an asymmetrical decryption function to the digital signature using a public key, wherein applying the asymmetrical decryption function generates a decryption result; and
determining whether the cryptographic hash of the license and the decryption result are equivalent.

6. The computer-implemented method of claim 1, wherein validating the digital signature further comprises:
applying a hash function to the license to generate a cryptographic hash of the license;
applying an asymmetrical decryption function to the digital signature using a public key, wherein applying the asymmetrical decryption function generates a decryption result, and wherein the public key corresponds to a private key that was previously used to generate the digital signature; and
determining whether the cryptographic hash of the license and the decryption result are equivalent.

7. A computer-implemented method, comprising:
receiving encrypted content that comprises a plurality of content segments, wherein each content segment is associated with a segment identifier;
receiving a license for the encrypted content, wherein the license comprises (a) a plurality of permissions, each of which is specific to one of the content segments, and (b) a master decryption key;
generating a portion-specific decryption key by performing a cryptographic hash function on a combination of the master decryption key and a particular segment identifier for a particular content segment;
decrypting the particular content segment using the portion-specific decryption key; and
providing access to the particular content segment in accordance with a particular permission that corresponds to the particular content segment.

8. The computer-implemented method of claim 7, further comprising:
receiving a digital signature for the license; and validating the digital signature to determine that the license has not been modified, wherein the digital signature is validated before generating the portion-specific decryption key.

9. The computer-implemented method of claim 7, wherein each of the plurality of content segments is encoded using a different portion-specific decryption key.

10. The computer-implemented method of claim 7, further comprising:
receiving a digital signature for the license; and
validating the digital signature to determine that the license has not been modified, wherein the digital signature is validated before generating the portion-specific decryption key, and wherein validating the digital signature comprises:
applying a hash function to the license to generate a cryptographic hash of the license;
applying an asymmetrical decryption function to the digital signature using a public key, wherein applying the asymmetrical decryption function generates a decryption result; and
determining whether the cryptographic hash of the license and the decryption result are equivalent.

11. The computer-implemented method of claim 7, further comprising:
receiving a digital signature for the license; and
validating the digital signature to determine that the license has not been modified, wherein the digital signature is validated before generating the portion-specific decryption key, and wherein validating the digital signature comprises:
applying a hash function to the license to generate a cryptographic hash of the license;
applying an asymmetrical decryption function to the digital signature using a public key, wherein applying the asymmetrical decryption function generates a decryption result, and wherein the public key corresponds to a private key that was previously used to generate the digital signature; and
determining whether the cryptographic hash of the license and the decryption result are equivalent.

12. The computer-implemented method of claim 7, further comprising generating the combination of the master decryption key and the particular segment identifier by concatenating the master decryption key and the particular segment identifier.

13. The computer-implemented method of claim 7, wherein the license further comprises content information that identifies the encrypted content.

14. A non-transitory computer readable medium storing program instructions that are computer-executable to implement a digital rights management component that is configured to:
receive a content item that is encrypted with a master decryption key;
receive a license for the content item, wherein the license comprises (a) a user identifier that identifies a user requesting the content item, and (b) an encrypted version of the master decryption key, wherein the encrypted version is generated using a user-specific key that is derived by applying a cryptographic hash function to the user identifier;
receive a digital signature for the license;

validate the digital signature to determine that the license has not been modified; and
in response to validating the digital signature, provide access to the content item by (a) applying the cryptographic hash function to the user identifier included in the license to generate the user-specific key, (b) decrypting the encrypted version of the master decryption key using the user-specific key, and (c) decrypting at least a portion of the content item using the master decryption key.

15. The non-transitory computer readable medium of claim 14, wherein:
the master decryption key comprises a combination of a decryption key and a segment identifier that identifies the portion of the content item; and
only the portion of the content item is decrypted using the master decryption key.

16. The non-transitory computer readable medium of claim 14, wherein the encrypted version of the master decryption key is decrypted using the user-specific key and a symmetrical decryption function.

17. The non-transitory computer readable medium of claim 14, wherein:
the license further comprises a plurality of permissions, each of which is specific to a respective portion of the content item; and
the digital rights management component is further configured to provide access to the respective portions of the content item in accordance with the plurality of permissions.

18. The non-transitory computer readable medium of claim 14, wherein the license further comprises content information that identifies the content item.

19. The non-transitory computer readable medium of claim 14, wherein validating the digital signature further comprises:
applying a hash function to the license to generate a cryptographic hash of the license;
applying an asymmetrical decryption function to the digital signature using a public key, wherein applying the asymmetrical decryption function generates a decryption result; and
determining whether the cryptographic hash of the license and the decryption result are bitwise equivalents of each other.

20. The non-transitory computer readable medium of claim 14, wherein validating the digital signature further comprises:
applying a hash function to the license to generate a cryptographic hash of the license;
applying an asymmetrical decryption function to the digital signature using a public key, wherein applying the asymmetrical decryption function generates a decryption result, and wherein the public key corresponds to a private key that was previously used to generate the digital signature; and
determining whether the cryptographic hash of the license and the decryption result are bitwise equivalents of each other.

* * * * *